(12) United States Patent
Ishizaka et al.

(10) Patent No.: US 9,816,658 B2
(45) Date of Patent: Nov. 14, 2017

(54) CONNECTOR

(71) Applicant: NIFCO INC., Yokohama-shi, Kanagawa (JP)

(72) Inventors: Taiichi Ishizaka, Sagamihara (JP); Hideaki Takahashi, Yokohama (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 549 days.

(21) Appl. No.: 14/368,690

(22) PCT Filed: Dec. 25, 2012

(86) PCT No.: PCT/JP2012/083533
§ 371 (c)(1),
(2) Date: Jun. 25, 2014

(87) PCT Pub. No.: WO2013/099887
PCT Pub. Date: Jul. 4, 2013

(65) Prior Publication Data
US 2014/0339821 A1 Nov. 20, 2014

(30) Foreign Application Priority Data
Dec. 27, 2011 (JP) ................................. 2011-286079

(51) Int. Cl.
*F16L 37/00* (2006.01)
*F16L 37/12* (2006.01)
(Continued)

(52) U.S. Cl.
CPC ............. *F16L 37/12* (2013.01); *F16L 37/088* (2013.01); *F16L 37/144* (2013.01)

(58) Field of Classification Search
USPC .......................... 285/305, 319, 308, 321, 921
See application file for complete search history.

(56) References Cited

U.S. PATENT DOCUMENTS 5,863,077 A * 1/1999 Szabo ................... F16L 37/144
285/3
6,866,303 B2 * 3/2005 Szabo ................... F16L 37/144
285/305

(Continued)

FOREIGN PATENT DOCUMENTS

| JP | 2007-255668 A | 10/2007 |
| JP | 2009-236206 A | 10/2009 |
| JP | 2011-174508 U | 9/2011 |

OTHER PUBLICATIONS

Europe Patent Office, "Search Report for EP 12862825.2," May 19, 2015.

(Continued)

Primary Examiner — Aaron Dunwoody
Assistant Examiner — Fannie Kee
(74) Attorney, Agent, or Firm — Manabu Kanesaka

(57) ABSTRACT

A lock member is provided in a housing movably between a standby position and a connected position. In a state wherein the lock member is locked in the standby position, when a pipe is inserted into an opening portion of the housing, the lock member is unlocked so as to be movable into the connected position; however, a tip portion of a detection stopper abuts against a flange portion of the pipe so as to prevent the lock member from moving into the connected position. Next, when the pipe is inserted further, and the flange portion passes the position of the detection stopper, the detection stopper moves into the connected position together with the lock member.

1 Claim, 8 Drawing Sheets

(51) Int. Cl.
*F16L 37/14* (2006.01)
*F16L 37/088* (2006.01)

(56) References Cited

U.S. PATENT DOCUMENTS

| | | | |
|---|---|---|---|
| 7,566,077 B2 * | 7/2009 | Tsurumi | F16L 37/144 |
| | | | 285/305 |
| 8,033,575 B2 * | 10/2011 | Tsurumi | F16L 37/144 |
| | | | 285/305 |
| 2004/0075274 A1 * | 4/2004 | Szabo | F16L 37/144 |
| | | | 285/305 |
| 2005/0087981 A1 | 4/2005 | Yamada et al. | |
| 2006/0267341 A1 * | 11/2006 | Takayanagi | F16L 37/144 |
| | | | 285/305 |
| 2007/0273150 A1 * | 11/2007 | Tsurumi | F16L 37/144 |
| | | | 285/305 |
| 2012/0326435 A1 | 12/2012 | Okazaki | |

OTHER PUBLICATIONS

PCT, "International Search Report for PCT/JP2012/083533", Feb. 27, 2013.

* cited by examiner

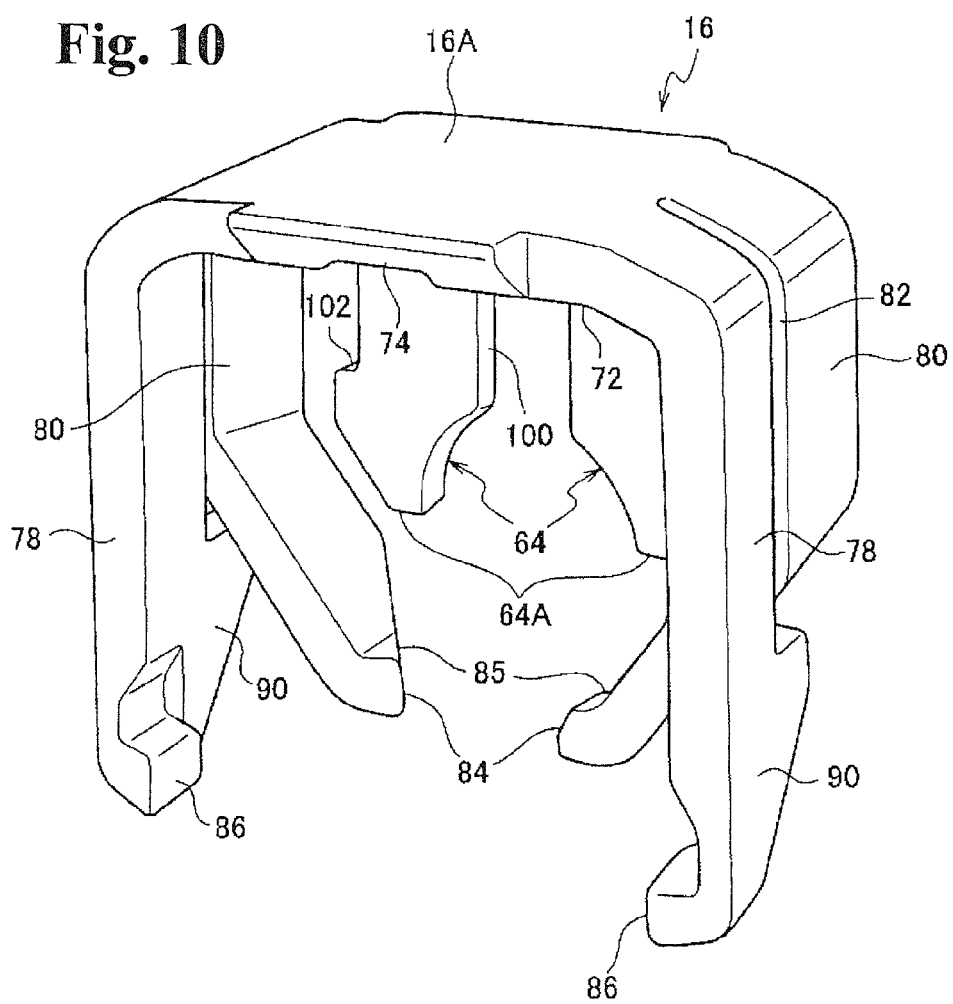

CONNECTOR

RELATED APPLICATIONS

The present application is National Phase of International Application No. PCT/JP2012/083533 filed Dec. 25, 2012, and claims priority from Japanese Application No. 2011-286079, filed Dec. 27, 2011.

FIELD OF TECHNOLOGY

The present invention relates to a connector connecting a pipe.

BACKGROUND ART

There is known a connector connecting a pipe. For example, in Patent Document 1, the pipe is connected to the connector only by inserting the pipe into the connector. Specifically, a lock member mounted on a connector main body is locked in a standby position wherein the pipe can be inserted into the connector main body. By inserting the pipe, the aforementioned locking into the connector main body is released, so that the lock member moves into a connected position so as to prevent the pipe from coming out.

PRIOR ART DOCUMENT

Patent Document

Patent Document 1: Japanese Unexamined Patent Application Publication No. 2011-174508

SUMMARY OF THE INVENTION

Problems to be Solved by the Invention

The present invention provides a connector in which the pipe is connected to the connector only by inserting the pipe into the connector, and in a connected state of the pipe, wobbling in an insertion direction of the pipe can be reduced.

Means for Solving the Problems

In the first aspect of the present invention, a connector comprises a connector main body forming a circular opening portion into which a pipe wherein an annular flange portion is formed on an outer peripheral face is inserted; a lock member provided in the connector main body and moving between a standby position where the flange portion of the pipe can pass through the opening portion, and a connected position where the flange portion of the pipe moves in a radial direction of the opening portion, and the pipe is connected; a lock portion provided in the lock member, and locking the lock member in the connector main body at the standby position; an urging mechanism provided in the lock member, projecting into the opening portion, releasing a locked state of the lock member by the lock portion by being expanded outward when the flange portion abuts at an insertion time of the pipe, and restoring to original state and coming around along an outer peripheral face of the flange portion so as to move the lock member into the connected position; and a detection stopper provided in the lock member, abutting against the flange portion when the locked state is released so as to prevent the lock member from moving into the connected position, and moving into the connected position together with the lock member when the pipe is inserted further and the abutment against the flange portion is released, to be positioned on a side opposite to an insertion direction of the pipe more than the flange portion, and to overlap with the flange portion when the detection stopper is viewed from an axis direction of the pipe.

In the aforementioned aspect, the connector comprises the connector main body in which the circular opening portion is formed, and the pipe in which the annular flange portion is formed on the outer peripheral face is inserted into the opening portion. Also, in the connector main body, there is provided the lock member, and the lock member moves between the standby position where the flange portion of the pipe can pass through the opening portion, and the connected position where the flange portion of the pipe moves in the radial direction of the opening portion and the pipe is connected.

In the lock member, there are provided the lock portion and the urging mechanism, and the lock portion locks the lock member in the connector main body at the standby position. Also, the urging mechanism projects into the opening portion of the connector main body, and when the flange portion abuts at the insertion time of the pipe, the urging mechanism is pressed and expanded outward so as to release the locked state of the lock member by the lock portion. Thereby, the urging mechanism restores to the original state and comes around along the outer peripheral face of the flange portion of the pipe so as to attempt to move the lock member into the connected position. Incidentally, the "restore" here also includes a case wherein urging forces slightly remain in the urging mechanism other than a case wherein all urging forces in the urging mechanism are released so that the urging mechanism becomes a natural state.

On the other hand, in the lock member, there is provided the detection stopper, and the detection stopper abuts against the flange portion of the pipe when the locked state of the lock member by the lock portion is released so as to prevent the lock member from moving into the connected position. Consequently, the pipe is inserted further, and the abutment between the detection stopper and the flange portion is released, so that the detection stopper becomes movable into the connected position together with the lock member. Then, when the lock member moves into the connected position, the detection stopper is positioned on the side opposite to the insertion direction of the pipe more than the flange portion, and when the pipe is viewed from the axis direction of the pipe, the detection stopper and the flange portion overlap. Consequently, in a state wherein the pipe is connected to the connector, the pipe is prevented from moving toward the side opposite to the insertion direction.

Namely, when the flange portion of the pipe passes the position of the detection stopper, the lock member in which the locked state is already released automatically moves from the standby position to the connected position so as to become a connected state. Consequently, compared to a conventional structure wherein after the flange portion of the pipe passes the position of the detection stopper, the locked state of the lock member by the lock portion is released so as to move the lock member into the connected position, in the connected state of the pipe, wobbling in the insertion direction of the pipe can be reduced.

Also, the pipe is connected to the connector only by inserting the pipe into the opening portion of the connector, i.e., a one-touch operation-type, so that a connecting operation of the pipe is simple, and an operator is not required to move the lock member by hand so as to allow workability to be excellent.

As for a second aspect of the present invention, in the first aspect of the present invention, the urging mechanism is an elastic piece projecting into the opening portion from an outside of the connector main body, and at the standby position of the lock member, the urging mechanism may abut against the pipe at a position beyond an axis line of the pipe inserted into the opening portion.

In the aforementioned aspect, in a state wherein the pipe is not inserted, the lock member is located at the standby position. Also, at the standby position of the lock member, when the pipe is inserted, the urging mechanism abuts against the pipe at the position beyond the axis line of the pipe so as to be pressed and expanded outward, and the urging forces are accumulated in the urging mechanism.

Consequently, when the locked state of the lock portion is released, the urging mechanism restores to original state while releasing the urging forces, and comes around along the outer peripheral face of the flange portion of the pipe. Thereby, the lock member can be movable in a connected positional direction. Consequently, when the flange portion of the pipe passes the position of the detection stopper, the lock member automatically moves into the connected position.

As for a third aspect of the present invention, in the second aspect of the present invention, the lock portion may include a leg piece extending parallel to the elastic piece; a pressing portion provided at an end portion of the leg piece, positioned outside the elastic piece, and pressed by being abutted against the elastic piece; and an engaging portion provided at an end portion of the leg piece, and engaging with an engaged portion formed in the connector main body at the standby position and the connected position.

In the aforementioned aspect, in the lock portion, there is provided the leg piece extending parallel to the elastic piece, and at the end portion of the leg piece, there are provided the pressing portion and the engaging portion. The pressing portion is located outside the elastic piece, and is pressed by being abutted against the elastic piece. Also, when the flange portion of the pipe abuts, the elastic piece is pressed and expanded outward; however, at that time, the elastic piece abuts against the pressing portion, and presses the pressing portion so as to press and expand the leg piece outward through the pressing portion.

On the other hand, the engaging portion engages with the engaged portion formed in the connector main body at the standby position and the connected position of the lock member so as to allow the lock member to be in the locked state; however, when the leg piece is pressed and expanded outward by the pressing portion, an engagement state between the engaging portion and the engaged portion is released, so that the locked state of the lock member is released.

Effect of the Invention

The first aspect of the present invention has the aforementioned structure, so that the pipe is connected to the connector only by inserting the pipe into the connector, and in the connected state of the pipe, the wobbling in the insertion direction of the pipe can be reduced.

The second aspect of the present invention has the aforementioned structure, so that the lock member can be reliably moved into the connected position.

The third aspect of the present invention has the aforementioned structure, so that the lock member can reliably be locked and unlocked.

BRIEF DESCRIPTION OF THE DRAWINGS

FIG. 10 is a perspective view showing the lock member of the connector and viewed from a direction opposite to FIG. 9 according to the second embodiment of the present invention.

BEST MODES OF CARRYING OUT THE INVENTION

First Embodiment

A connector according to the first embodiment of the present invention will be explained according to FIG. 1 to FIG. 8.

Figure 1:
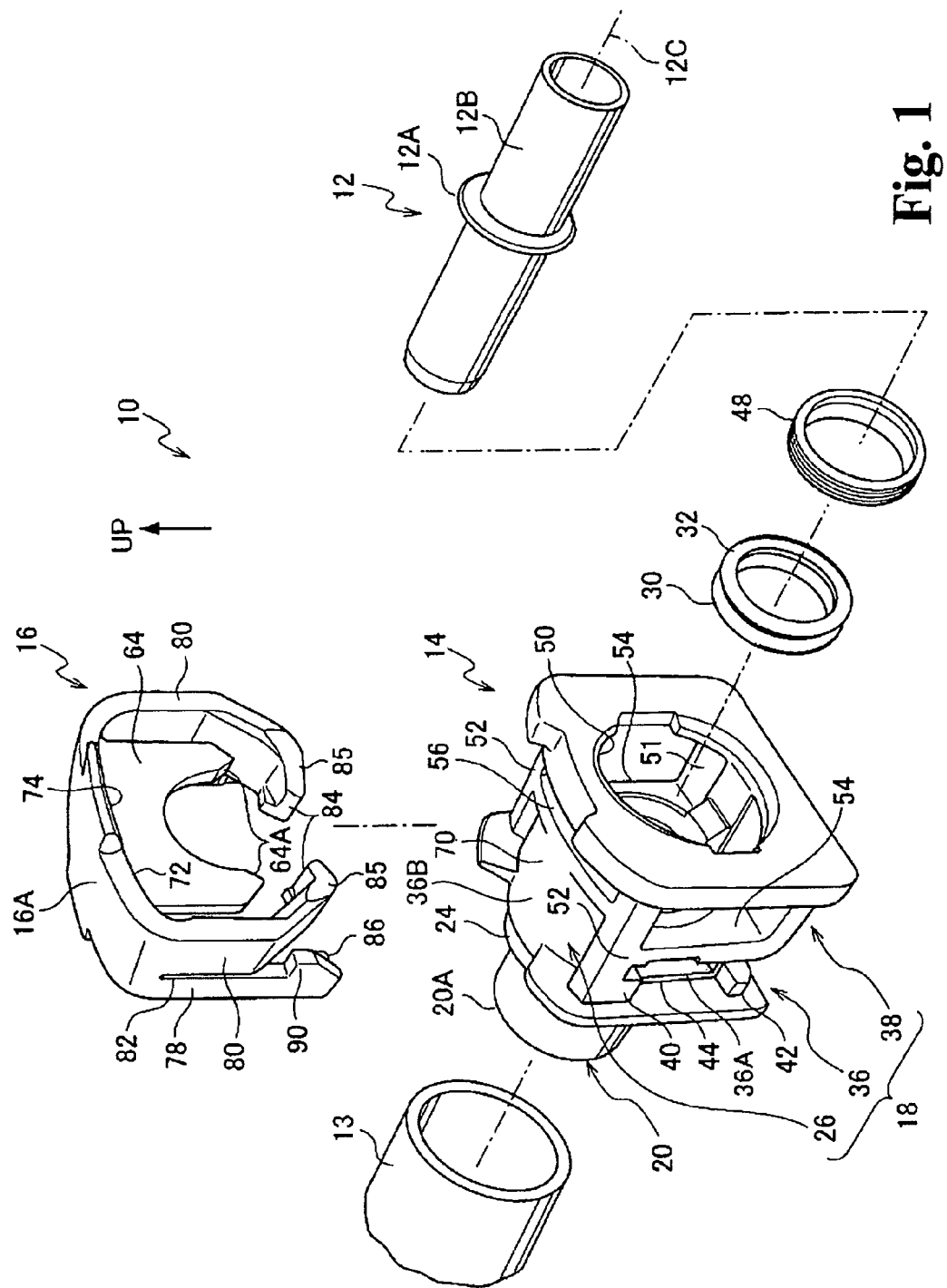
FIG. 1 is an exploded perspective view showing a connector according to the first embodiment of the present invention.
Figure 2:
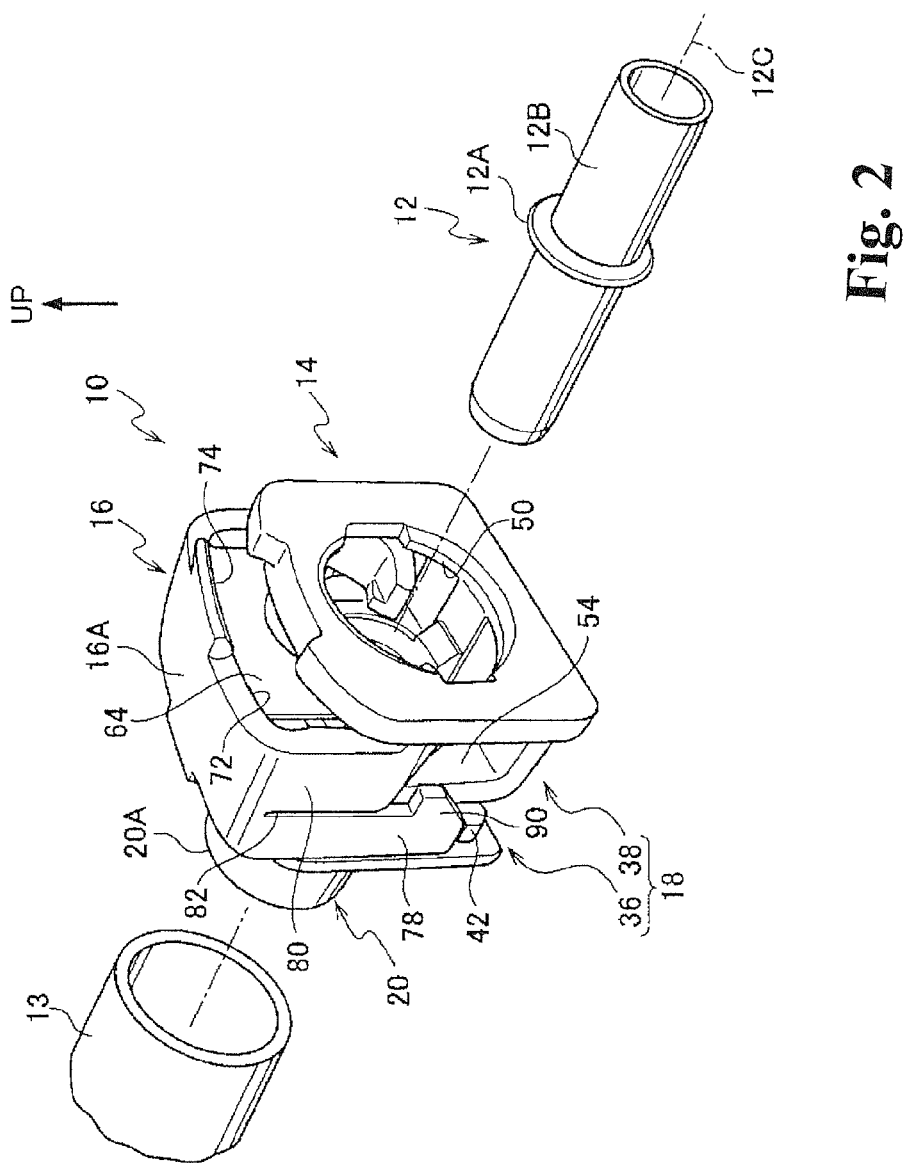
FIG. 2 is a perspective view showing a standby position of a lock member in the connector according to the first embodiment of the present invention.

A connector 10 of the present embodiment shown in FIG. 1 is used for, for example, fastening a cooling water piping inside an engine room of a vehicle, a pipe 12 made of metal is connected, and a tube 13 made of resin is mounted. Incidentally, for the sake of explanation, an arrow UP shown in FIG. 1 and FIG. 2 represents an upward direction of the connector 10.

Structure of the Connector

As shown in FIG. 1, the connector 10 comprises a housing 14 (a connector main body) as the connector main body forming approximately a cylinder shape; and a lock member 16 mounted on an outer periphery of the housing 14 and having approximately an inverted U shape. On one end side of the housing 14, there is provided a connection portion 18 on which the lock member 16 is movably mounted and to which the pipe 12 is connected, and on the other end side of the housing 14, there is provided an insertion portion 20 into which the tube 13 is inserted.

Figure 8:
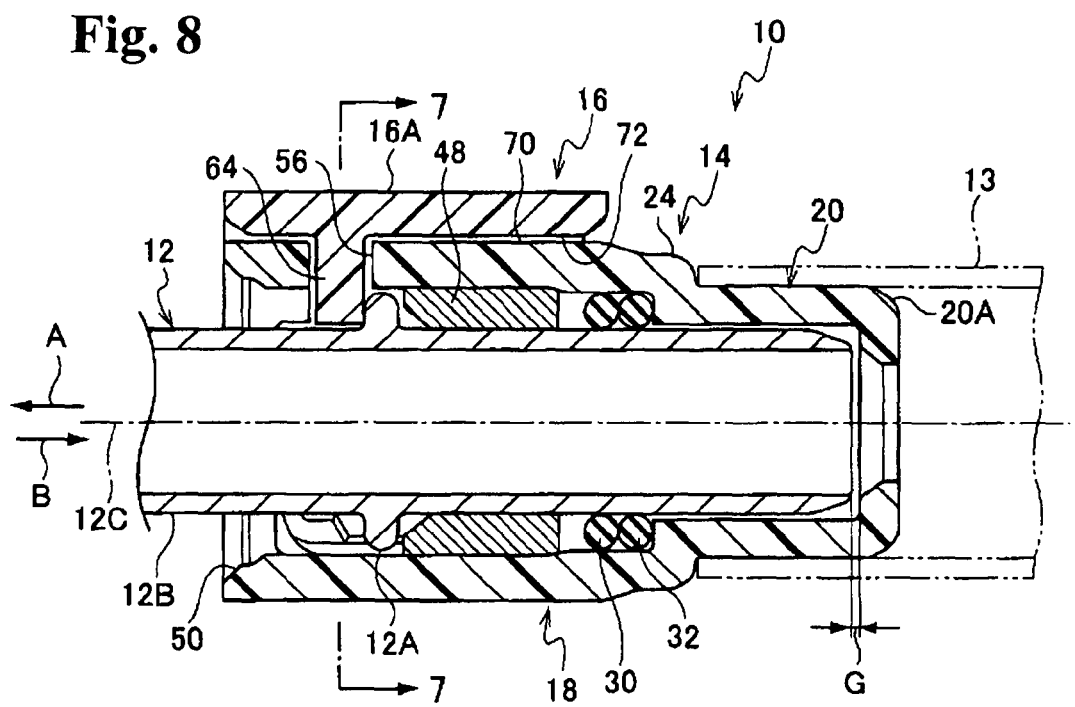
FIG. 8 is a cross-sectional view taken along a cross-sectional line 8-8 in FIG. 7.

As shown in FIG. 8, in a tip portion (the other end portion of the housing 14) 20A of the insertion portion 20, there are formed tapered portions, and tips of the tapered portions have a diameter smaller than that of the tube 13 shown in FIG. 1, so that the tube 13 can be easily inserted.

Between the insertion portion 20 and the connection portion 18, there is provided an intermediate diameter portion 24 having a diameter larger than an outer diameter size of the insertion portion 20, and a tip face of the tube 13 abuts against a tip face of the intermediate diameter portion 24 so as to prevent a movement of the tube 13. Also, in that state, although it is not shown in the drawings, by a special clamp and the like, the tube 13 can be reliably fixed in the insertion portion 20.

As shown in FIG. 1, in the connection portion 18, one end side has approximately a cylinder shape, and the other end side has an external shape of approximately a square shape. On one end side of the connection portion 18, there is provided a large diameter portion 26 having a diameter larger than that of the intermediate diameter portion 24 provided in the insertion portion 20, and on an inner peripheral face of the large diameter portion 26, there is concaved an annular concave portion (not shown in the drawings). In the annular concave portion, there are fitted O-rings 30 and 32 so as to fill and seal a gap between the inner peripheral face of the large diameter portion 26 and an outer peripheral face of the pipe 12 when the pipe 12 is connected to the connection portion 18.

Incidentally, although it is not shown in the drawings, between the O-ring 30 and the O-ring 32, there may be disposed an annular spacer forming a rectangular shape in a cross section so as to compress the O-ring 30 and the O-ring 32 and to enhance a sealing force with the outer peripheral face of the pipe 12.

Also, on the other end side of the connection portion 18, there are provided a lock portion 36 and a mounting portion 38 along an axial direction of the housing 14, and the lock portion 36 is disposed on a large diameter portion 26 side. In the mounting portion 38, there can be mounted the lock member 16, and in the lock portion 36, the mounted lock member 16 is locked at a predetermined position.

Consequently, in a side wall 36A of the lock portion 36, there are respectively projected projecting portions 40 and 42 (engaged portions) as the engaged portions having rectangular parallelepipeds at an upper part and a lower part of the side wall 36A. Also, between the projecting portion 40 and the projecting portion 42, there is provided a gap 44.

On an inner peripheral face of the lock portion 36, there is concaved an annular concave portion (not shown in the drawings). In the annular concave portion, there can be fitted an annular bush 48 in a state of protruding from the inner peripheral face of the lock portion 36. An inner diameter size of the bush 48 is approximately the same as an outer diameter size of the pipe 12. Incidentally, the bush 48 is made of, for example, polyacetal, nylon, and the like.

In the mounting portion 38 which is one end portion of the housing 14, there is formed an opening portion 50 having a circular shape along the axial direction of the housing 14. The opening portion 50 has a diameter larger than the inner diameter of the bush 48, and has a size in which an annular flange portion 12A formed on the outer peripheral face of the pipe 12 can be inserted.

In the mounting portion 38, there are formed right-and-left through holes 54 and an upper through hole 56 leaving a lower wall portion 51 and bridged portions 52 on both upper corner portions. On the other hand, from an inner face of a base portion 16A positioned at a center of the lock member 16, there is drooped a detection stopper 64 corresponding to the through hole 56 formed in the mounting portion 38, and the lock member 16 can be mounted from an upper side of the mounting portion 38.

The base portion 16A of the lock member 16 has an arc face 72 facing an arc portion 70 formed on an upper wall 36B of the lock portion 36 of the housing 14 and having approximately the same curvature. Also, at a connected position of the lock member 16, the base portion 16A of the lock member 16 can surface-contact with the upper wall 36B of the lock portion 36.

Figure 3:
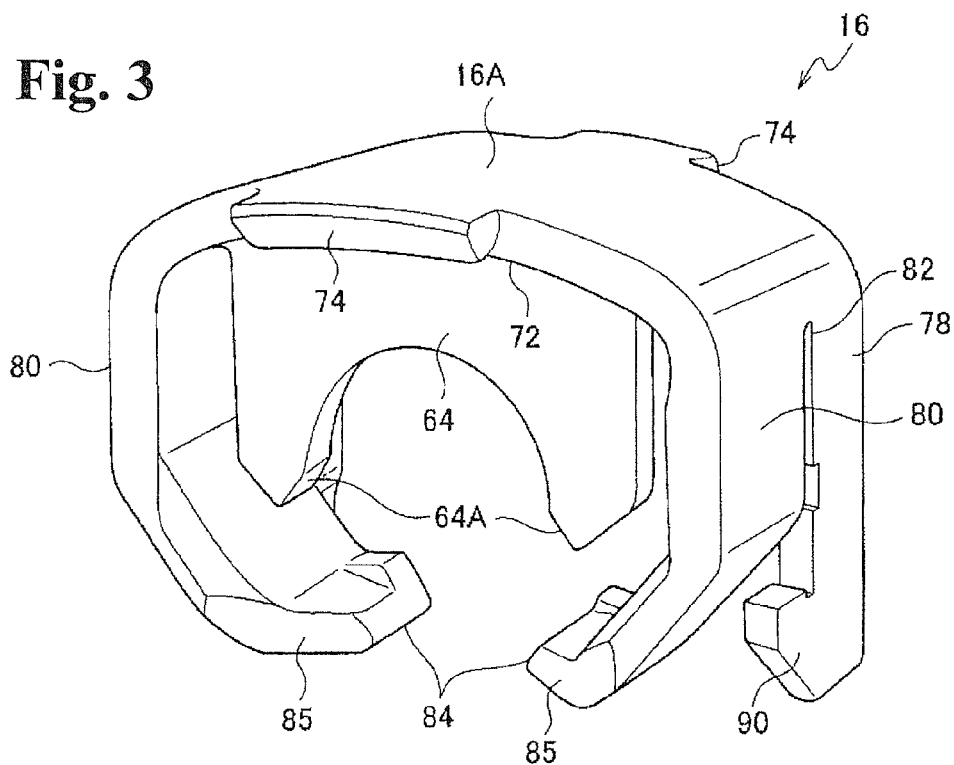
FIG. 3 is a perspective view showing the lock member of the connector according to the first embodiment of the present invention.

As shown in FIG. 3, at both edges of a center portion in a longitudinal direction in the base portion 16A of the lock member 16, operating inclination portions 74 are formed to protrude at positions facing the upper wall 36B of the lock portion 36 in the connection portion 18. Each operating inclination portion 74 is exposed from the upper wall 36B of the connection portion 18 at the connected position of the lock member 16 so as to allow a flathead screwdriver or a special jig to be inserted.

Figure 5:
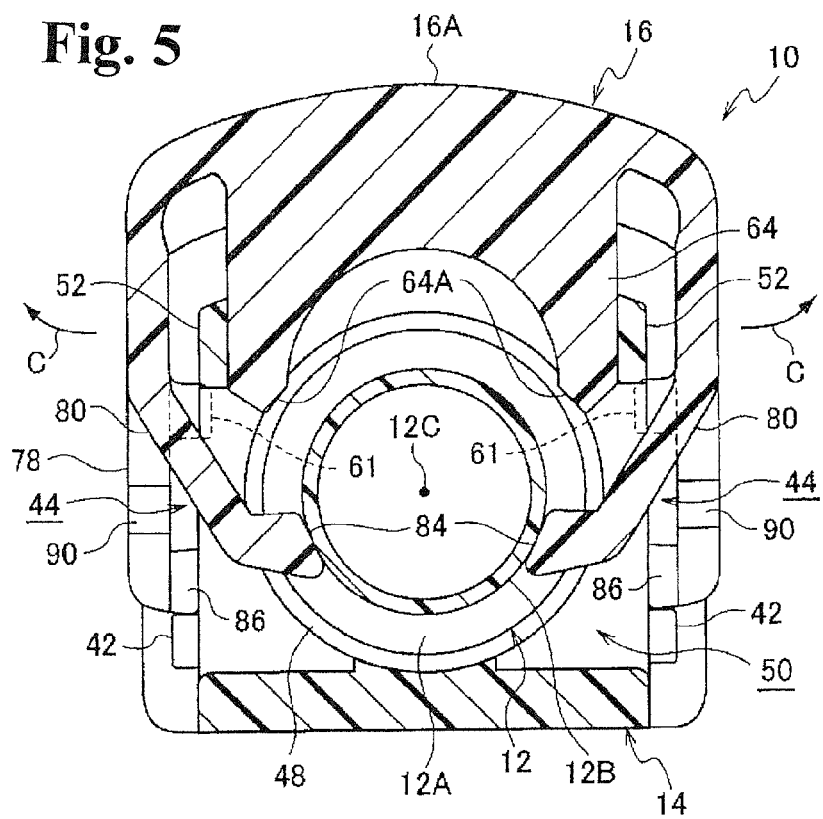
FIG. 5 is a cross-sectional view showing the standby position of the lock member of the connector and corresponding to FIG. 7 according to the first embodiment of the present invention.

As shown in FIG. 5, a tip portion 64A of each detection stopper 64 is formed as an arc having approximately the same radius as the outer diameter size of the pipe 12, and can abut against the outer peripheral face of the pipe 12. Also, as shown in FIG. 8, at the connected position of the lock member 16, there is formed a gap between the detection stopper 64 and the bush 48 in the axial direction of the housing 14, and the flange portion 12A of the pipe 12 can be disposed inside the gap.

The inner diameter of the bush 48 and the curvature radius of the tip portion of the detection stopper 64 are approximately the same as the outer diameter of the pipe 12, and have diameters smaller than an outer diameter of the flange portion 12A of the pipe 12. Consequently, in a state wherein the flange portion 12A is disposed inside the gap, when the pipe 12 is viewed toward an insertion direction (an arrow B direction in FIG. 8) of the pipe 12, the flange portion 12A comes to a state of being covered with the detection stopper 64. Namely, the detection stopper 64 and the flange portion 12A overlap. Specifically, by the bush 48 and the detection stopper 64, the pipe 12 is prevented from moving in an axis direction (an arrow A direction and the arrow B direction in FIG. 8).

As shown in FIG. 1, corner portions of the respective end faces of the lock portion 36 and the mounting portion 38 in the connection portion 18 protrude outward from the upper wall 36B of the lock portion 36, the lower wall portion 51, and surfaces of the bridged portions 52, and in a state wherein the lock member 16 is mounted on the mounting portion 38, the corner portions can respectively abut against end faces in a width direction of the lock member 16. Consequently, the lock member 16 is prevented from moving along the axial direction of the housing 14 so as to prevent the lock member 16 from wobbling.

From both ends in the longitudinal direction of the base portion 16A of the lock member 16, there are drooped elastic pieces (urging mechanisms) 80 and locking pieces 78 (leg pieces) respectively in parallel. The locking pieces 78 are provided corresponding to the lock portion 36, and the elastic pieces 80 are provided corresponding to the mounting portion 38. Also, between each elastic piece 80 and each locking piece 78, there is provided a slit 82, and the locking piece 78 and the elastic piece 80 can be elastically deformed respectively.

The elastic pieces 80 are bent toward directions in which both end sides thereof mutually approach, pass through the through holes 54 formed on side walls of the mounting portion 38, and project to an inner diameter side more than the bush 48. Also, as shown in FIG. 4, inside a center portion in a longitudinal direction of the locking pieces 78, there are provided projections 61, and in a state wherein the elastic pieces 80 pass through the through holes 54 and the lock member 16 is mounted on the mounting portion 38, the projections 61 abut against the bridged portions 52 so as to prevent the lock member 16 from moving in an upward direction.

As shown in FIG. 3, at tip portions of the elastic pieces 80, there are provided abutment portions 84 bending in a direction of mutually approaching along approximately a horizontal direction. From the abutment portions 84 to center portions in extending directions of the elastic pieces 80, end faces on an opening portion 50 side have tapers 85 guiding the pipe 12 to a back side of the connection portion 18.

As shown in FIG. 5, when the pipe 12 is inserted into the opening portion 50 of the housing 14, an outer peripheral face 12B of the pipe 12 abuts against the abutment portion 84, and through the abutment portion 84, the elastic piece 80 is pressed and expanded outward (arrow C directions in FIG. 5). There, a position of the abutment portion 84 is set in such a way as to contact with the inserted pipe 12 at a downward position beyond an axis line 12C.

Figure 4:
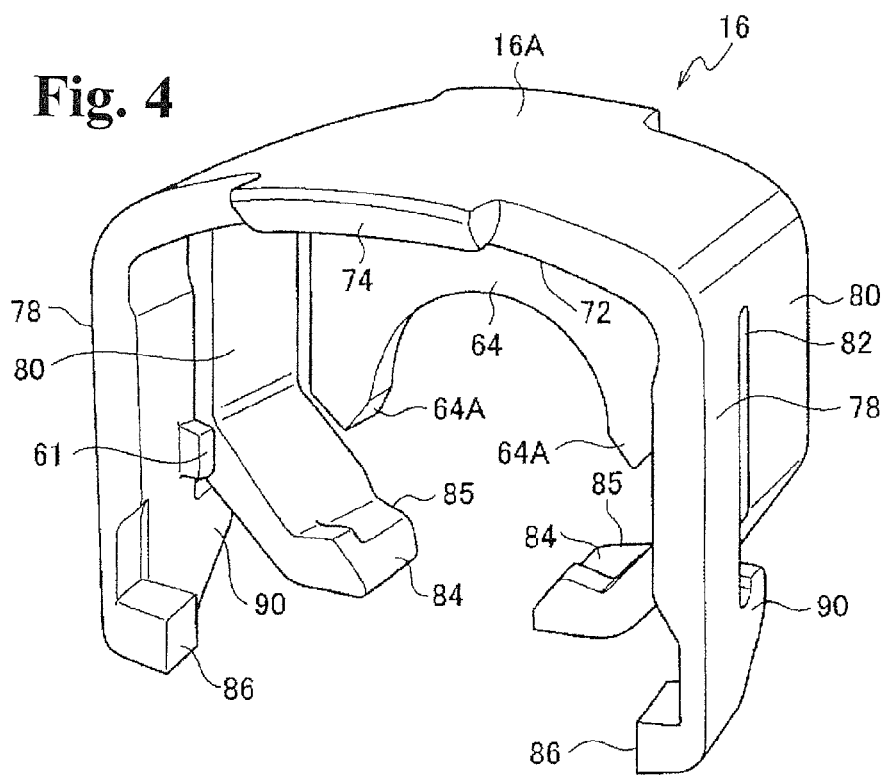
FIG. 4 is a perspective view showing the lock member of the connector and viewed from a direction opposite to FIG. 3 according to the first embodiment of the present invention.

As shown in FIG. 4, at tip portions of the locking pieces 78, there are provided locking portions 86 (engaging portions) as the engaging portions extending along an inside direction. The locking portions 86 can be inserted into the respective gaps 44 provided between the projecting portions 40 and the projecting portions 42 provided in the lock portion 36 of the connection portion 18 of the housing 14.

As shown in FIG. 5, in a state wherein each locking portion 86 is disposed inside the gap 44 and abuts against an upside face of the projecting portion 42, the lock member 16 is prevented from moving in a downward direction. In this standby position, although there is provided a gap between the locking portion 86 and a downside face of the projecting portion 40 (see FIG. 1), as described hereinbefore, in the state wherein the lock member 16 is mounted on the mounting portion 38, the projections 61 provided in the locking pieces 78 abut against lower faces of the bridged portions 52 so as to prevent the lock member 16 from moving in the upward direction.

Namely, in the standby position of the lock member 16, the lock member 16 is prevented from moving in an up-and-down direction, and in that standby position, the pipe 12 can be inserted into the opening portion 50.

As shown in FIG. 4, at tip portion sides of the locking pieces 78, there are provided pressing pieces 90 (pressing portions) as the pressing portions extending on elastic piece 80 sides. Each pressing piece 90 is disposed outside the elastic piece 80 in a state wherein a gap is provided between the pressing piece 90 and the elastic piece 80, and the elastic piece 80 is pressed and expanded outward so as to contact with the pressing piece 90.

Figure 6:
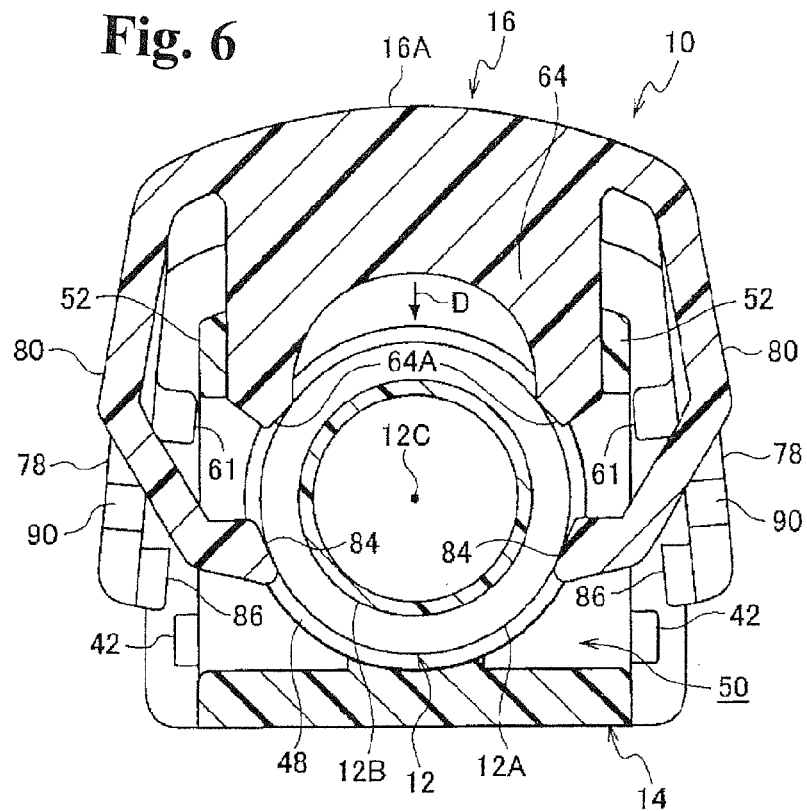
FIG. 6 is a cross-sectional view showing an unlocked state of the lock member of the connector and corresponding to FIG. 7 according to the first embodiment of the present invention.

As shown in FIG. 6, when the elastic piece 80 is pressed and expanded further, through the pressing piece 90, the locking piece 78 is pressed and expanded outward. At that time, the elastic piece 80 and the locking piece 78 come to a state wherein urging forces are accumulated. Also, when the locking piece 78 is pressed and expanded outward, a locked state at the standby position of the lock member 16 where the locking portion 86 of the locking piece 78 abuts against the projecting portion 42 is released.

There, as mentioned above, the position of the abutment portion 84 provided in the tip portion of the elastic piece 80 is set in such a way as to contact with the inserted pipe 12 at a position beyond the axis line 12C. Consequently, when the locked state at the standby position of the lock member 16 is released, the elastic piece 80 and the locking piece 78 restore to original state while releasing the urging forces, and the abutment portion 84 of the elastic piece 80 comes around along an outer peripheral face of the flange portion 12A of the pipe 12 so as to attempt to move the lock member 16 in a connected positional direction (an arrow D direction in FIG. 6).

However, as shown in FIG. 6, the tip portion 64A of the detection stopper 64 abuts against an outer peripheral portion of the flange portion 12A of the pipe 12 so as to prevent the lock member 16 from moving into the connected position.

Next, as shown in FIG. 8, the pipe 12 is inserted further, and moves in the arrow B direction in FIG. 8, and when the flange portion 12A passes the position of the detection stopper 64, the tip portion 64A of the detection stopper 64 comes out of the flange portion 12A, and the detection stopper 64 moves into the connected position together with the lock member 16.

Figure 7:
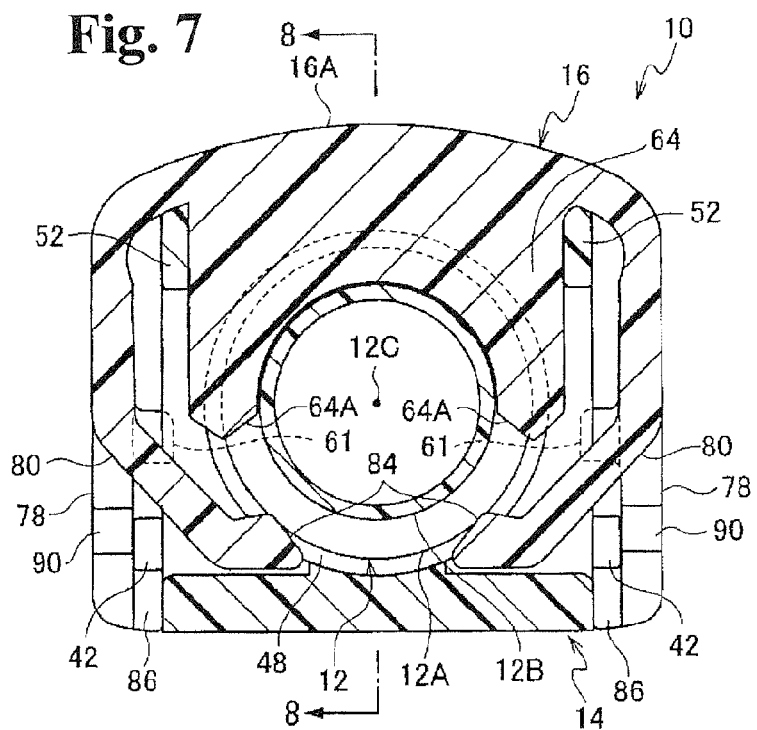
FIG. 7 is a cross-sectional view showing a connected position of the lock member of the connector and taken along a cross-sectional line 7-7 in FIG. 8 according to the first embodiment of the present invention.

At that time, as shown in FIG. 7, the locking portion 86 climbs over an upper face of the projecting portion 42, and hits a downside face of the projecting portion 42 so as to prevent the lock member 16 from moving upward. Also, in that state, the urging forces of the elastic piece 80 and the locking piece 78 are released. Then, approximately at the same time when the locking portion 86 is prevented from moving upward, the base portion 16A of the lock member 16 abuts against the upper wall 36B of the lock portion 36 so as to prevent the lock member 16 from moving downward. Namely, in that state, the lock member 16 comes to the connected position where the lock member 16 is prevented from moving in the up-and-down direction.

Incidentally, in the present embodiment, although the locking portion 86 abuts against an upside face of the projecting portion 40 at the standby position of the lock member 16, and abuts against the downside face of the projecting portion 42 at the connected position of the lock member 16, it is not limited to the above provided that the lock member 16 can be prevented from moving at the standby position and the connected position of the lock member 16. For example, in place of the projecting portions 40 and 42, there may be formed a concave portion in which the locking portion 86 can be engaged or be locked.

Operation and Effect of the Connector

Next, an operation and an effect of the connector according to the present embodiment will be explained.

As shown in FIG. 2, at the standby position wherein the pipe 12 is not inserted into the connection portion 18 of the housing 14 of the connector 10, there is provided a gap between the base portion 16A of the lock member 16 and the upper wall 36B of the connection portion 18 shown in FIG. 1.

Also, at the standby position, the locking portion 86 provided at the tip portion of the locking piece 78 of the lock member 16 is disposed in the gap 44 provided between the projecting portion 40 and the projecting portion 42 of the lock portion 36, and abuts against the upside face of the projecting portion 42 so as to prevent the lock member 16 from moving in the downward direction. Also, the projection 61 provided in the elastic piece 80 abuts against the bridged portion 52 so as to prevent the lock member 16 from moving in the upward direction. Namely, at the standby position of the lock member 16, the lock member 16 is prevented from moving in the up-and-down direction.

In that state, as shown in FIG. 5, when the pipe 12 is inserted into the opening portion 50 of the connection portion 18, the outer peripheral face 12B of the pipe 12 abuts against the abutment portion 84 provided at the tip portion of the elastic piece 80 so as to press and expand the elastic piece 80 outward through the abutment portion 84.

Moreover, when the pipe 12 is moved to the back side of the connection portion 18, as shown in FIG. 6, the flange portion 12A of the pipe 12 abuts against the abutment portion 84, and presses and expands the abutment portion 84 outward further. Thereby, the elastic piece 80 is pressed and expanded outward further, and the elastic piece 80 abuts against the pressing piece 90 so as to press and expand the locking piece 78 outward through the pressing piece 90. Thereby, at the standby position of the lock member 16, the locked state is released, and the lock member 16 comes into a state movable in the downward direction (the arrow D direction in FIG. 6) of the connection portion 18.

On the other hand, the abutment portion 84 is set so as to contact with the inserted pipe 12 at the position beyond the axis line of the pipe 12, and the urging forces are accumulated in the locking piece 78 and the elastic piece 80. Consequently, when the locked state at the standby position of the lock member 16 is released, the elastic piece 80 and the locking piece 78 restore to original state while releasing the urging forces.

Thereby, the abutment portion 84 of the elastic piece 80 comes around along the outer peripheral face of the flange portion 12A of the pipe 12 so as to attempt to move the lock member 16 downward (the arrow D direction in FIG. 6).

However, as shown in FIG. 6, the tip portion 64A of the detection stopper 64 abuts against the outer peripheral face of the flange portion 12A of the pipe 12 so as to prevent the lock member 16 from moving in the direction to the connected position (the arrow D direction in FIG. 6).

Next, as shown in FIG. 8, the pipe 12 is inserted further, and when the flange portion 12A passes the position of the detection stopper 64, the tip portion 64A of the detection stopper 64 comes out of the flange portion 12A of the pipe 12. When the tip portion 64A of the detection stopper 64 comes out of the flange portion 12A of the pipe 12, as shown in FIG. 7, the detection stopper 64 moves into the connected position together with the lock member 16.

At that time, the locking portion 86 climbs over the upper face of the projecting portion 42, and abuts against the downside face of the projecting portion 42 so as to prevent the lock member 16 from moving upward, and the pipe 12 is connected to the connector 10.

Thus, in the connector 10 of the present embodiment, at the standby position of the lock member 16, when the pipe 12 is inserted, the lock member 16 moves into the connected position from the standby position. At that time, the tip portion 64A of the detection stopper 64 abuts against the outer peripheral portion of the flange portion 12A of the pipe 12 so as to prevent the lock member 16 from moving into the connected position. Then, when the pipe 12 is inserted further, and the flange portion 12A passes the position of the detection stopper 64, the detection stopper 64 moves into the connected position together with the lock member 16.

Consequently, in the connector 10 of the present embodiment, as in a conventional connector, the connector 10 does not have a structure that releases the locked state of the lock member by the lock portion after the flange portion of the pipe passes the position of the stopper so as to move the lock member into the connected position. Namely, the locked state of the locking piece 78 at the standby position is released, so that in the conventional structure in which the lock member 16 directly moves into the connected position, after the flange portion 12A of the pipe 12 reliably passes the position of the detection stopper 64, the locked state is required to be released. As a result, in order to prevent interference between the detection stopper 64 and the flange portion 12A of the pipe 12 at an unlocking time, a size tolerance among the elastic piece 80, the locking piece 78, and the detection stopper 64 is accumulated. On the other hand, in the present embodiment, the pipe 12 is inserted and at a moment when the flange portion 12A passes the position of the detection stopper 64, the detection stopper 64 moves into the connected position, so that the aforementioned size tolerance is not accumulated. As a result, as shown in FIG. 8, in the connected state of the pipe 12, wobbling (an over stroke) G in the insertion direction of the pipe 12 can be reduced. Also, since an excessive over stroke of the pipe 12 can be eliminated, the pipe 12 becomes difficult to be removed when the pipe 12 is strongly twisted so as to become stronger relative to a vibration load.

Also, in the present embodiment, the pipe 12 is connected to the connector 10 only by inserting the pipe 12 into the opening portion 50 of the connector 10, i.e., a one-touch operation-type, so that a connecting operation of the pipe 12 is simple, and an operator is not required to move the lock member 16 by hand so as to allow workability to be excellent and to be convenient.

On the other hand, in a case wherein the pipe 12 is removed from the connector 10, in the connected state, the flathead screwdriver or the special jig is inserted into the operating inclination portion 74 provided at the center portion of the lock member 16 so as to lift the lock member 16 upward. Thereby, the abutment portion 84 is pressed and expanded outward along the outer peripheral face of the pipe 12, the elastic piece 80 is pressed and expanded outward through the abutment portion 84, and the elastic piece 80 abuts against the pressing piece 90 so as to press and expand the locking piece 78 outward through the pressing piece 90.

Then, the locking portion 86 of the locking piece 78 climbs over the projecting portion 40, and the locked state of the locking portion 86 of the locking piece 78 is released. Consequently, the lock member 16 is held in a state of being lifted upward by the flathead screwdriver or the special jig. Then, in the state wherein the lock member 16 is lifted upward, the detection stopper 64 is moved into a position which does not interfere with the flange portion 12A so as to allow the pipe 12 to move in a removal direction.

Second Embodiment

The connector according to a second embodiment of the present invention will be explained according to FIG. 9 and FIG. 10.

Figure 9:
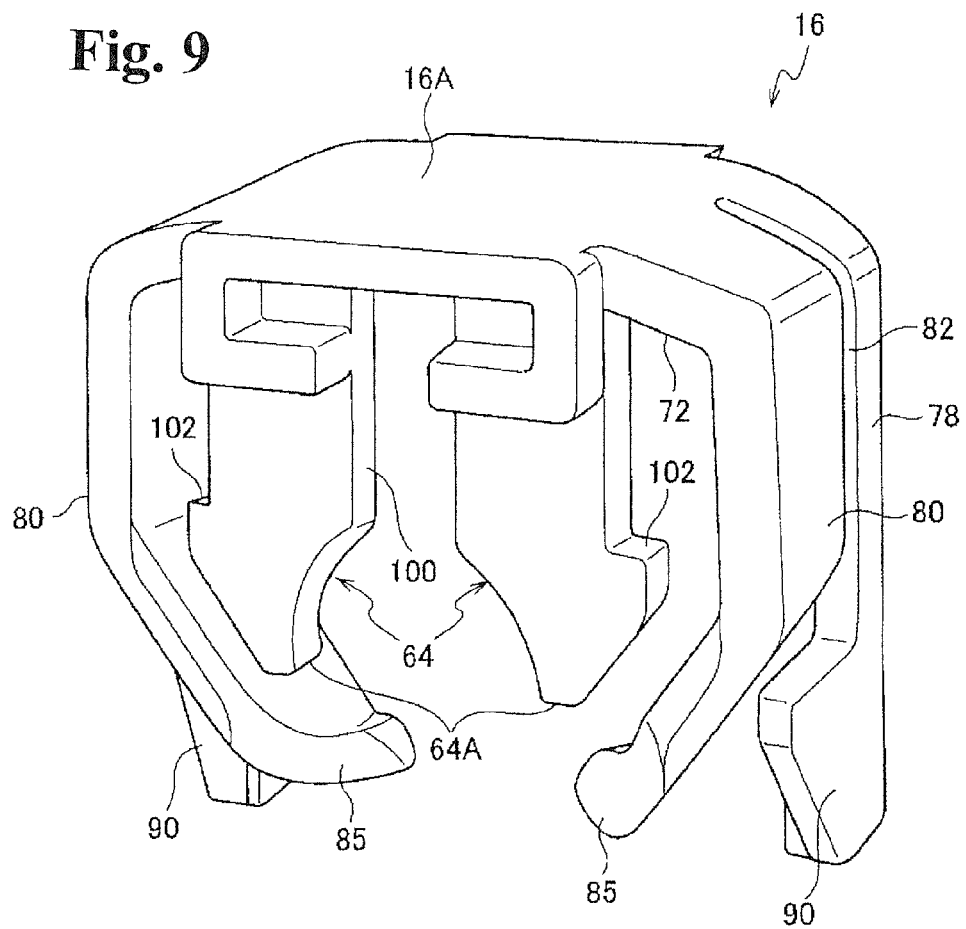
FIG. 9 is a perspective view showing the lock member of the connector according to a second embodiment of the present invention.

As shown in FIG. 9 and FIG. 10, in the present embodiment, in place of the projections 61 in the first embodiment, at respective tip outside portions of the detection stoppers 64 divided into two by a slit 100, there are formed claw portions 102 protruding in a direction of being separated from each other. Then, the claw portions 102 are engaged with a peripheral edge portion of the through hole 56 of the housing 14 so as to prevent the lock member 16 from moving in the upward direction. Incidentally, the present embodiment also includes an operational effect similar to that of the first embodiment.

Other Embodiments

In the above, although specific embodiments of the present invention have been explained in detail, the present invention is not limited to the embodiments described hereinabove, and it is obvious for one skilled in the art that the present invention can be variously modified within the range of the present invention. For example, in each embodiment described hereinabove, as shown in FIG. 1, the pressing piece 90 and the locking portion 86 are provided in the locking piece 78 provided in the lock member 16; however, in place of that, other structures may be used provided that in the structures, the locked state at the standby position of the locking portion 86 is released by being pressed and expanded outward by the elastic piece 80.

Consequently, the elastic piece 80 and the locking piece 78 are not necessarily required to have two pieces, and as long as there are at least one elastic piece 80 and one locking piece 78, the effect by the present invention can be attained. Also, the shape of the locking piece 78 is not specially limited to the aforementioned shape.

Also, in the present embodiment, in the housing 14 shown in FIG. 1, the insertion portion 20 and the connection portion 18 are coaxially provided; however, it is not limited to the above provided that the pipe 12 and the tube 13 can be connected through the housing 14.

For example, there may be connected an elbow portion between the insertion portion 20 and the connection portion 18, and the insertion portion 20 and the connection portion 18 may be intersected orthogonally through the elbow portion. Thus, by diversifying the shape of the housing 14, the connector 10 can be used differently in consideration of a positional relationship of the pipe 12 and the tube 13.

What is claimed is:

1. A connector, comprising:
   a connector main body having a circular opening portion into which a pipe with an annular flange portion on an outer peripheral face is adapted to be inserted;
   a lock member provided in the connector main body and moving between a standby position where the flange portion of the pipe is adapted to pass through the opening portion, and a connected position where the lock member is moved in a radial direction of the opening portion to allow the pipe to be connected;
   a lock portion provided in the connector main body, and locking the lock member to the connector main body at the standby position;
   an urging mechanism provided in the lock member, projecting into the opening portion, releasing a lock state of the lock member by the lock portion by being expanded outward when the flange portion is adapted to abut at an insertion time of the pipe, and restoring to an original state and coming around along an outer peripheral face of the flange portion so as to move the lock member into the connected position; and
   a detection stopper provided in the lock member,
   wherein the lock member, the urging mechanism and the detection stopper are arranged such that when the pipe is adapted to be inserted into the connector, the detection stopper is adapted to abut against the flange portion so as to prevent the lock member from moving into the connected position; when the pipe is adapted to be inserted further, the flange portion is adapted to pass the detection stopper; and immediately after the flange portion passes the detection stopper, the detection stopper moves into the connected position, to thereby be positioned on a side of the opening portion of the connector main body relative to the flange portion to thereby prevent wobbling of the pipe in the connector,
   the urging mechanism is an elastic piece projecting into the opening portion from an outside of the connector main body, and at the standby position of the lock member, the urging mechanism is adapted to abut against the pipe at a position beyond an axis line of the pipe inserted into the opening portion, and
   the lock member includes:
      a leg piece extending parallel to the elastic piece;
      a pressing portion provided at an end portion of the leg piece, positioned outside the elastic piece, and pressed by being abutted against the elastic piece;
      an engaging portion provided at an end portion of the leg piece, and engaging with an engaged portion formed in the connector main body at the standby position and the connected position;
      a projection formed inside the leg piece to prevent the lock member in the standby position from moving in an upward direction; and
      inclination portions protruding outwardly from a center portion of the lock member.

* * * * *